J. J. HILL.
Potato Digger.

No. 49,521.

Patented Aug. 22, 1865.

Witnesses
Theodore Long
James M. Fowler

Inventor
J. J. Hill
by his attorney
S. S. Fahnestock

UNITED STATES PATENT OFFICE.

J. J. HILL, OF XENIA, OHIO.

IMPROVEMENT IN POTATO-DIGGERS.

Specification forming part of Letters Patent No. 49,521, dated August 22, 1865.

*To all whom it may concern:*

Be it known that I, J. J. HILL, of Xenia, county of Greene, and State of Ohio, have invented a new and Improved Machine for Digging and Gathering Potatoes; and I do hereby declare that the following is a full and exact description thereof, reference being had to the accompanying drawings, and to the letters of reference marked thereon, like letters denoting like parts in the several figures.

The nature of my invention consists in so constructing a machine that it can be used on rows of potatoes or hills having the vines thereon, and in passing over these the vines will be properly severed, the potatoes dug, gathered, and carried to a receptacle attached to the machine—all this at one operation or passing over the rows.

To enable others skilled in the art to make and use my invention, I will proceed to describe its construction and operation.

Figure 1:
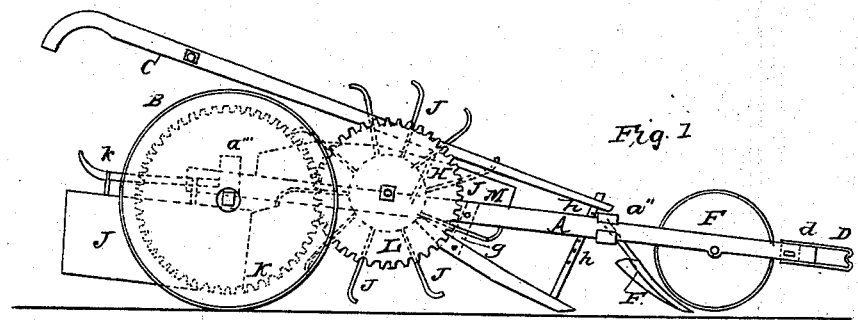
Figure 2:
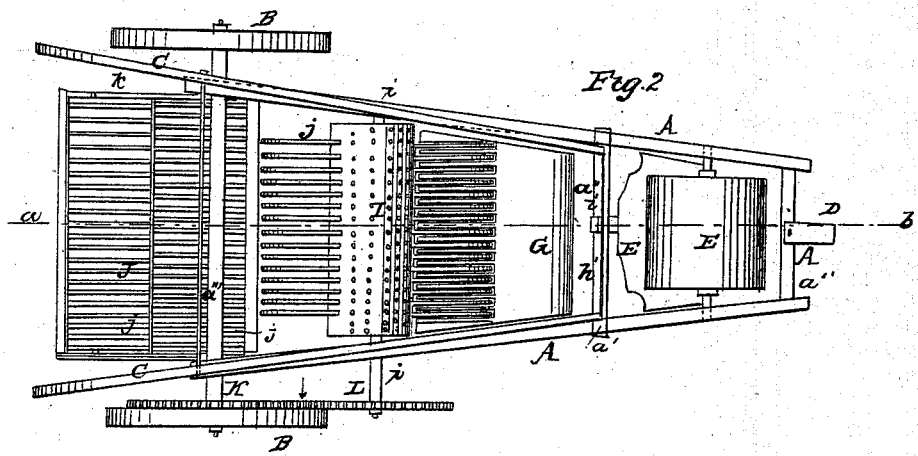
Figure 3:
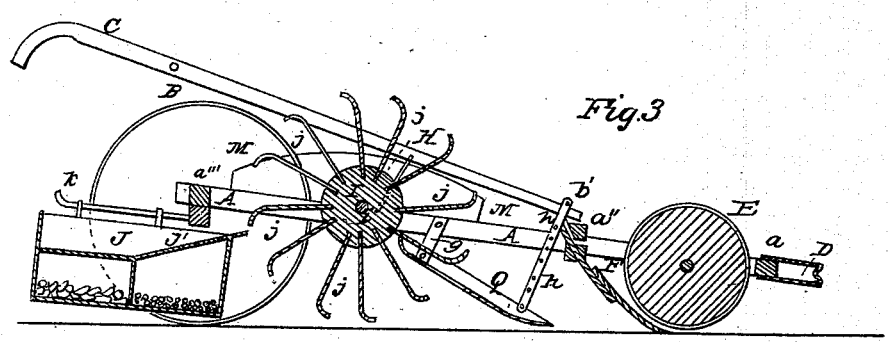

In the drawings, Figure 1 represents a side view of my machine; Fig. 2, a top view, and Fig. 3 a longitudinal section on line $a\,b$, Fig. 2.

A represents the principal frame supported by the wheels. It has three cross-pieces, $a'$, $a''$, and $a'''$, the latter serving as an axle for the hind wheels, B. Above this frame A there are two guiding-handles, C, similar to plow-handles, and these can be raised or lowered, as will be presently described.

D is the clevis; E, a front wheel or roller to mash clods and flatten the vines.

F is a shovel, just underneath and behind E, intended as a vine and weed cutter, dressing the ridge on which it travels, preparing it for the grated shovel G behind. Shovel F is capable of some adjustment, which will be presently explained. G is hung on pivots $g$, so as to permit front end to be raised or lowered.

H are fulcrums attached to handles C. The front part of these handles is connected with front part of grated shovel G by elevators or pieces $h$.

I is a cylinder, which revolves on its axis $i\,i$ and carries a number of rows of radial teeth, $j$, bent at their outer ends. These pass through the openings in the grated shovel and gather the potatoes therefrom, carrying them around.

J is a box or receptacle on the rear of the machine to receive the potatoes, having several gratings, $j'$, in it through which dirt can pass, and which also serve to assort the potatoes. It is hung on two arms, $k$, and can easily be removed and replaced when emptied. A projection on the inside of left-hand wheel, in its revolution, strikes a similar one on the box, giving the same an oscillating or shaking movement, assisting in getting rid of any remaining dirt.

K is a toothed wheel attached to inside of the right-hand wheel, which engages with cog-wheel L on the axis of toothed cylinder I, and which gives it its revolution.

The front shovel, F, has a center piece running up from it, passing through cross-piece $a''$, and an adjusting and fastening wedge, $b'$, holds it in place, and will permit the shovel to be raised or lowered.

When the machine is not in use it is desirable to raise both shovels, so that the machine can be moved without their taking hold in the ground. To raise the grated shovel it is only necessary to press down upon the handles C, which act as levers on the fulcrums H. A cross-bar, $h'$, passing through holes in the elevators or connecting-pieces $h$, (and its ends resting on frame A,) keeps the shovel G at the height it is set, so it may be made to clear the ground or run under the potatoes in the hill, which it should do when in use digging. While the front roller, E, is on the ridge the hind wheels are in the side furrows, and the frame is then horizontal.

M are fenders to keep the potatoes from rolling off at the side of the machine while being carried from the shovel to the box in rear. The cylinder I could be given motion by a crank or in other equivalent way, and its teeth should be so near together as to pick up the smallest-sized potatoes wanted. The gratings of shovel G should correspond.

The operation of the machine is as follows: Having adjusted the depth both shovels are to be set, the front to trim above the potatoes, the hinder one to get under and dig them, the machine is started. The front roller mashes clods and presses down vines. Its shovel follows, cuts off vines and weeds, and throws aside top dirt. The grated shovel follows, getting under and raising the potatoes, which ride up, with some dirt, upon it. The gratings allow most of the latter to fall through. The teeth of the cylinder in its revolution come through the gratings of shovel, and, like so many fingers, pick up the potatoes, carrying them around rearward, and on the opposite side they roll off onto the top grating of box J. Here the smaller ones fall through into the front part, while the larger ones roll back into the hinder part. The box can be emptied, when desired, onto the ground or into a wagon, which may follow.

In Fig. 2 the cylinder I is shown with most of its teeth removed.

Having thus described my invention, what I claim as new, and desire to secure by Letters Patent of the United States, is—

1. The combination of the roller E with the shovel F, operating in the manner described, and for the purpose set forth.

2. The combination of roller E and shovel F with grated shovel G, toothed cylinder I, and receiving-box J, operating conjointly in the manner substantially as described, and for the purpose set forth.

J. J. HILL.

Witnesses:
LEWIS WRIGHT,
S. W. BROWN.